United States Patent
Yang et al.

(10) Patent No.: US 11,132,379 B2
(45) Date of Patent: *Sep. 28, 2021

(54) DATABASE DATA MODIFICATION REQUEST PROCESSING

(71) Applicant: Ant Financial (Hang Zhou) Network Technology Co., Ltd., Zhejiang (CN)

(72) Inventors: Zhenkun Yang, Hangzhou (CN); Fusheng Han, Hangzhou (CN)

(73) Assignee: ANT FINANCIAL (HANG ZHOU) NETWORK TECHNOLOGY CO., LTD., Zhejiang (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/722,469

(22) Filed: Dec. 20, 2019

(65) Prior Publication Data

US 2020/0125581 A1    Apr. 23, 2020

Related U.S. Application Data

(63) Continuation of application No. 16/240,549, filed on Jan. 4, 2019, which is a continuation of application No. PCT/CN2017/090269, filed on Jun. 27, 2017.

(30) Foreign Application Priority Data

Jul. 4, 2016   (CN) .......................... 201610518735.2

(51) Int. Cl.
*G06F 16/27*     (2019.01)
*G06F 16/23*     (2019.01)

(52) U.S. Cl.
CPC .......... *G06F 16/27* (2019.01); *G06F 16/2358* (2019.01); *G06F 16/2379* (2019.01)

(58) Field of Classification Search
CPC ... G06F 16/27; G06F 16/2379; G06F 16/2358
See application file for complete search history.

(56) References Cited

U.S. PATENT DOCUMENTS 5,430,869 A     7/1995   Ishak et al.
5,701,480 A  *  12/1997  Raz .......................... G06F 9/466
                                                              714/19

(Continued)

FOREIGN PATENT DOCUMENTS

CN        1848071        10/2006
CN       101681313        3/2010

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Tamara T Kyle
*Assistant Examiner* — Lahcen Ennaji
(74) *Attorney, Agent, or Firm* — Fish & Richardson P.C.

(57) ABSTRACT

A data modification request for modifying data in a primary database is received at the primary database. Based on the data modification request, second data in the primary database is modified to first data. Based on the data modification request, a first log and a second log are generated, where the first log is a simplified log including the first data and the second log is a complete log including the second data. Persistence processing is performed on the first log. A modification result that corresponds to the data modification request is returned.

24 Claims, 8 Drawing Sheets

(56) References Cited

U.S. PATENT DOCUMENTS

| | | | |
|---|---|---|---|
| 6,052,695 A * | 4/2000 | Abe | G06F 11/1471 |
| 6,684,223 B1 | 1/2004 | Ganesh et al. | |
| 6,981,004 B2 | 12/2005 | Ganesh et al. | |
| 2004/0054644 A1 | 3/2004 | Ganesh et al. | |
| 2004/0111557 A1* | 6/2004 | Nakatani | G06F 11/1435 |
| | | | 711/113 |
| 2005/0187891 A1* | 8/2005 | Johnson | G06F 11/202 |
| 2010/0274758 A1* | 10/2010 | Tahara | G06F 11/2028 |
| | | | 707/618 |
| 2012/0109895 A1 | 5/2012 | Zwilling et al. | |
| 2014/0089263 A1 | 3/2014 | Araki | |
| 2014/0279929 A1 | 9/2014 | Gupta et al. | |
| 2015/0254240 A1 | 9/2015 | Li et al. | |
| 2016/0196320 A1* | 7/2016 | Borowiec | G06F 3/067 |
| | | | 707/624 |
| 2017/0076012 A1* | 3/2017 | Sreenivasa | G06F 16/90335 |
| 2019/0155817 A1 | 5/2019 | Yang et al. | |
| 2020/0125581 A1 | 4/2020 | Yang et al. | |

FOREIGN PATENT DOCUMENTS

| | | |
|---|---|---|
| CN | 101681317 | 3/2010 |
| CN | 102024021 | 4/2011 |
| CN | 102270225 | 12/2011 |
| CN | 103166785 | 6/2013 |
| CN | 104462127 | 3/2015 |
| CN | 104537037 | 4/2015 |
| JP | 2006011848 | 1/2006 |
| JP | 2006268503 | 10/2006 |
| JP | 2009211215 | 9/2009 |
| JP | 2010257284 | 11/2010 |
| JP | 2013178685 | 9/2013 |
| TW | 201514684 | 4/2015 |

OTHER PUBLICATIONS

European Extended Search Report in European Patent Application No. 17823535.4, dated Apr. 4, 2019, 9 pages.

International Preliminary Report on Patentability in International Application No. PCT/CN2017/090269, dated Jan. 8, 2019, 10 pages (with English translation).

International Search Report by the International Searching Authority issued in International Application No. PCT/CN2017/090269 dated Sep. 30, 2017; 15 pages.

Nakamoto, "Bitcoin: A Peer-to-Peer Electronic Cash System," www.bitcoin.org, 2005, 9 pages.

Written Opinion in International Application No. PCT/CN2017/090269, dated Sep. 30, 2017, 9 pages (with English Translation).

Zhang et al., "Log Analysis of Oracle Database Based on LogMiner," Computer and Network, May 2013, 39(3):145-147 (with English abstract).

Nakamura Masahiro, "Asynchronous Renewal of the Reproduction File," NikkeiElectronics, Jun. 6, 1994, 26 pages [with English machine translation].

Anonymous, "Asynchronous Update of Replicated Files to a Key Technique", Nikkei Electronics, Jun. 6, 1994, 17 pages (with English abstract).

\* cited by examiner

DATABASE DATA MODIFICATION REQUEST PROCESSING

CROSS-REFERENCE TO RELATED APPLICATIONS

This application is a continuation of U.S. patent application Ser. No. 16/240,549, filed on Jan. 4, 2019, which is a continuation of PCT Application No. PCT/CN2017/090269, filed on Jun. 27, 2017, which claims priority to Chinese Patent Application No. 201610518735.2, filed on Jul. 4, 2016, and each application is hereby incorporated by reference in its entirety.

TECHNICAL FIELD

The present application relates to the field of database technologies, and in particular, to a database data modification request processing method and apparatus.

BACKGROUND

A database is a set of software running on a server, and is used to store, query, and manage large volumes of data. A database log is a storage content used by the database, and can be used to record operations that occurred in the database, for example, data modification operations. When the database is restarted, the log can be used to recover a previous normal running state. If the database sends the log to another database, the other database can also use the received log to recover a copy identical to the database that sends the log. This is a method for primary/secondary database synchronization. The log includes data after modification and data before modification, and in some scenarios even includes other data related to modified data and such.

In the existing technology, a user can send a data modification request to a database. The database correspondingly modifies data and generates a log based on the data modification request, performs persistence processing on the generated log (for example, stores the generated log in a hard disk), and then returns a modification result that corresponds to the data modification request to the user (for example, notify the user that modification succeeds). It is worthwhile to note that the generated log is usually in a transient state, and performing persistence processing is to prevent accidental losses caused by power failure or restart. Further, if the database has a secondary database, the database also first synchronizes the generated log to the secondary database, and then returns the modification result that corresponds to the data modification request.

However, performing persistence processing on the generated log or synchronizing the generated log to the secondary database both need to consume a lot of time. Consequently, it takes a relatively long time for a database data modification request processing mode in the existing technology.

SUMMARY

Implementations of the present application provide a database data modification request processing method and apparatus, to resolve a problem in the existing technology that a database data modification request processing mode takes a relatively long time.

The following technical solutions are used in the implementations of the present application:

An implementation of the present application provides a database data modification request processing method, including: receiving a data modification request for a database; modifying second data in the database to first data and generating a first log and a second log based on the data modification request, where the first log includes the first data, and the second log includes the second data; and returning a modification result that corresponds to the data modification request after performing persistence processing on the first log.

An implementation of the present application provides a database data modification request processing apparatus, including: a receiving module, configured to receive a data modification request for a database; a processing module, configured to modify second data in the database to first data and generate a first log and a second log based on the data modification request, where the first log includes the first data, and the second log includes the second data; and a return module, configured to return a modification result that corresponds to the data modification request after persistence processing is performed on the first log.

The at least one technical solution used in the implementations of the present application can achieve the following beneficial effects: Compared with the existing technology for generating a complete log that includes data after modification, data before modification, and other data related to modified data, in the solutions of the present application, two kinds of logs, namely the first log and the second log, that are not necessarily complete and whose contents are not identical, can be generated for any data modification request. The first data is the data after modification, and the second data is the data before modification. The first log can include only the first data but not the second data and the other data related to the modified data. Because a database status can be recovered or primary/secondary synchronization can be implemented based on only the data after modification without the second data and the other data related to the modified data, the modification result can be returned to the user after persistence processing is performed on the first log. Also, persistence processing consumes less time as a data volume of the first log is less than a data volume of a complete log, so that a database data modification request processing time can be reduced. Therefore, the problem in the existing technology can be partially or comprehensively alleviated.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to the implementations of the present application and the corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

Figure 1:
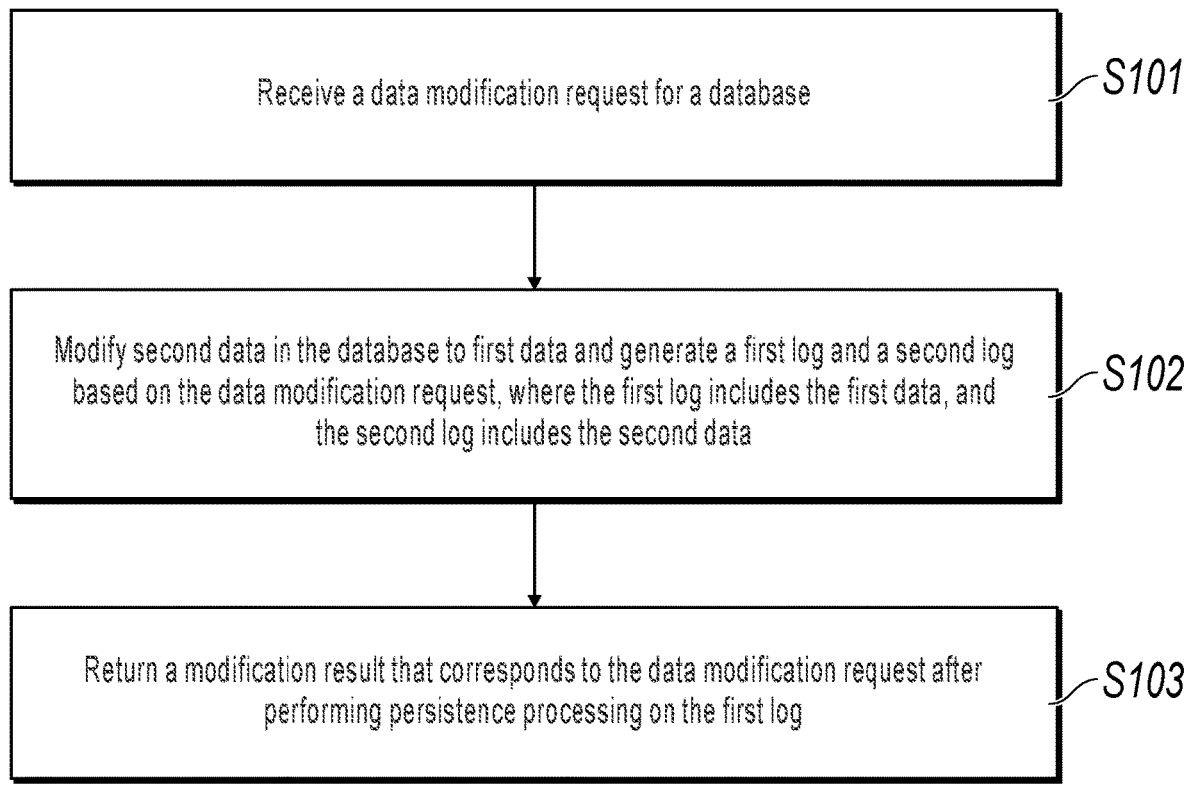
FIG. 1 is a schematic flowchart illustrating a database data modification request processing method, according to an implementation of the present application.

FIG. 1 is a schematic flowchart illustrating a database data modification request processing method, according to an implementation of the present application.

A procedure in FIG. 1 can be performed by a database, or a function module that does not belong to the database but can be connected to the database. A device where the database and/or the function module are/is located is not limited in the present application. The device includes but is not limited to a personal computer, a medium and large computer, a computer cluster, a mobile phone, a tablet computer, a smart watch, an in-vehicle mobile station, etc. that serves as a server or a client.

The procedure in FIG. 1 can include the following steps.

S101. Receive a data modification request for a database.

In the present implementation of the present application, the data modification request is a request for requesting to modify data in the database. The request can be manually sent by a user of the database, or automatically sent by executing an automation script. The data modification request includes at least one of the following requests: a data update request, a data deletion request, and a data addition request.

A format of the data modification request is not limited in the present application, and can be a structured query language (SQL) statement format, or can be other formats supported by the database.

S102. Modify second data in the database to first data and generate a first log and a second log based on the data modification request, where the first log includes the first data, and the second log includes the second data.

In the present implementation of the present application, the data modification request can indicate a request for performing a specific data modification operation. For example, the data modification request indicates a request for modifying the second data in the database to the first data. Certainly, in practice, the data modification request can be a request not that specific. For example, a data modification request can indicate a request for reducing a total volume of data in the database by half, etc. Data to be reduced can be determined by the database based on certain policies.

In the present implementation of the present application, the first data or the second data can be null. For example, for a data deletion request, the second data is not null, and the first data is null; for a data addition request, the first data is not null, and the second data is null; for a data update request, neither the first data nor the second data is null.

Contents of the first data and the second data are not limited in the present application, and can be a part or all of any type of data such as a database record, a data table, a data index, or a data graph.

In the present implementation of the present application, a log needs to include at least the first data if database recovery or primary/secondary synchronization needs to be performed based on the log. The second data and other data related to modified data are dispensable for database recovery or primary/secondary synchronization, and therefore can be excluded from the log. In the solutions of the present application, a problem in the existing technology can be alleviated based on such an idea. In the existing technology, there is only one kind of log (which is referred to as a complete log for ease of description), and both the first data and the second data are included in the complete log. The solutions of the present application provide two kinds of logs: the first log and the second log. The first log can be a simplified log specialized in database recovery or primary/secondary synchronization. Preferably, the first log can include only the first data (so that a data volume of the first log can be as small as possible). The second log can be a complete log or an incomplete log used to supplement the first log. For example, the second log can include both the second data and the first data, and can even include the other data related to the modified data and such. Alternatively, the second log can include only the second data.

In the present implementation of the present application, alternatively, the second log or the second log in combination with the first log can be used for database recovery or primary/secondary synchronization, and can be further used for tasks in addition to database recovery or primary/secondary synchronization, for example, performing real-time analysis on a data change in the database.

In the present implementation of the present application, a sequence of performing the two sub-steps of "modifying second data to first data" and "generating a first log and a second log" in step S102 is not limited. Usually, a modification operation is first performed, and a corresponding log is then generated. However, in practice, a log can be first generated, and a corresponding modification operation can be then performed, to prevent a log loss caused by an exception such as power failure that occurs when the modification operation is performed. In this case, even if an exception such as power failure occurs when performing the modification operation, the log can be rolled back based on an actual status of data in the database that is back to normal. It is helpful to ensure that the rolled-back log does not lose a log that should be included, and does not include a log with an error or a redundant log.

S103. Return a modification result that corresponds to the data modification request after performing persistence processing on the first log.

In the present implementation of the present application, the first log and the second log generated in step S102 can be generated in a memory or a buffer, and are in a transient and non-stable state after being generated. Usually, if at this time the database is restarted or powered off, the generated first log and the generated second log would be lost, and subsequently database recovery or primary/secondary synchronization cannot be performed, or other functions that need to use the logs cannot be implemented. To prevent such situations, persistence processing can be first performed on the first log, and the corresponding modification result can be then returned to a sender of the data modification request, to ensure that at least the first log that persistence processing is performed on can be used to perform database recovery or primary/secondary synchronization.

In the present implementation of the present application, persistence processing can be performed on the second log for the similar reason. However, the persistence processing performed on the second log can also not be placed on a key path of the data modification request processing procedure. The procedure in FIG. 1 does not include "performing persistence processing on the second log", and the execution of any step in the procedure in FIG. 1 does not need to be based on "performing persistence processing on the second log".

For example, a main thread or process can be used to perform the procedure in FIG. 1, and another thread (for example, a backend thread) or process can be used to perform persistence processing on the second log. The two actions may not interfere with each other.

In the present implementation of the present application, a content included in the returned modification result is not limited. The modification result can include only description of whether modification succeeds, or can include description of data after modification.

It is worthwhile to note that the steps in the procedure in FIG. 1 can be performed by the same device or different devices. For example, step S101 and step S102 can be performed by device 1, and step S103 can be performed by device 2. For another example, step S101 can be performed by device 1, and step S102 and step S103 can be performed by device 2.

According to the previous method, compared with the existing technology for generating a complete log that includes data after modification, data before modification, and other data related to modified data, two kinds of logs, namely the first log and the second log, that are not necessarily complete and whose contents are not identical can be generated for any data modification request in the solutions of the present application. The first data is the data after modification, and the second data is the data before modification. The first log can include only the first data, and does not include the second data and the other data related to the modified data. Because a database status can be recovered or primary/secondary synchronization can be implemented based on only the data after modification without the second data and the other data related to the modified data, the modification result can be returned to the user after persistence processing is performed on the first log. Also, persistence processing consumes less time as a data volume of the first log is less than a data volume of a complete log, so that a database data modification request processing time can be reduced. Therefore, the problem in the existing technology can be alleviated.

In addition, because the second log is also generated in the solutions of the present application, the second log can be a complete log or an incomplete log used to supplement the first log. Therefore, compared with a log in the existing technology, a total log content is not lacking, and the quantity of resources consumed to generate a log are almost the same. A function that can be implemented based on a log in the existing technology can still be implemented in the solutions of the present application.

Based on the previous method, an implementation of the present application further provides some implementation solutions and extended solutions of the previous method, which are described below.

In the present implementation of the present application, the persistence processing performed on the first log or the second log is mentioned above. The persistence processing is described below for ease of understanding. The persistence processing can include the following: storing a log in a nonvolatile storage device; and more specifically, can be recording the log in a file in a certain format, and then storing the file in the nonvolatile storage device. The nonvolatile storage device can be a storage device whose stored data is not lost when being powered off, for example, a hard disk, a read-only memory (ROM), an erasable programmable read-only memory (EPROM), an electrically erasable read-only memory (EEPROM), a flash memory, etc.

For example, a generated record can be recorded in a text, and the text can be stored in a hard disk.

In the present implementation of the present application, it can be seen from the previous description that, in addition to primary/secondary database synchronization and database recovery, the log can be used in other scenarios, such as data analysis. The second log can be used to implement scenarios, which are described in detail below.

In some application scenarios, the database is connected to an external system such as a data analysis system. The log of the database can be provided for the external system for other uses. The data analysis system is used as an example. The data analysis system can perform real-time or non-real-time analysis on a data change in the database based on the log sent by the database, and provide an analysis result for a related user, organization, etc.

For the accuracy and comprehensiveness of the data analysis result, in the data analysis system, the log needs to include data after modification (namely, the first data) and data before modification (namely, the second data), and even needs to include other related data (for example, other data that belongs to the same database record as the modified data).

In the present implementation of the present application, the second log can satisfy the need of the data analysis system. After the second log is generated or persistence processing is performed on the second log, the second log can be sent to the data analysis system, so that the data analysis system performs data analysis based on the second log. An analysis content of the data analysis system is not limited in the present application.

In the present implementation of the present application, to further improve robustness of the solutions of the present application, the modification result can be temporarily withheld after persistence processing is performed on the first log, and returned after the first log is synchronized to the secondary database or another device. As such, it is convenient for the secondary database to synchronize the modification in time. In addition, it is equivalent to backing up the first log. The first log can still be retrieved from the secondary database or another device even if a storage device that is used for persistence processing on the first log is faulty.

For example, when the database is a primary database, before step S103 of returning a modification result that corresponds to the data modification request, the following step can be further performed: synchronizing the first log to a secondary database of the database, so that the secondary database synchronizes the modification based on the first log.

According to the previous analysis, in an actual application scenario, the first log is a simplified log that includes only the first data, and the second log is a complete log that includes at least the first data and the second data. Based on FIG. 2 and FIG. 3, a processing procedure in the existing technology and a processing procedure in the solutions of the present application are compared and analyzed.

Figure 2:
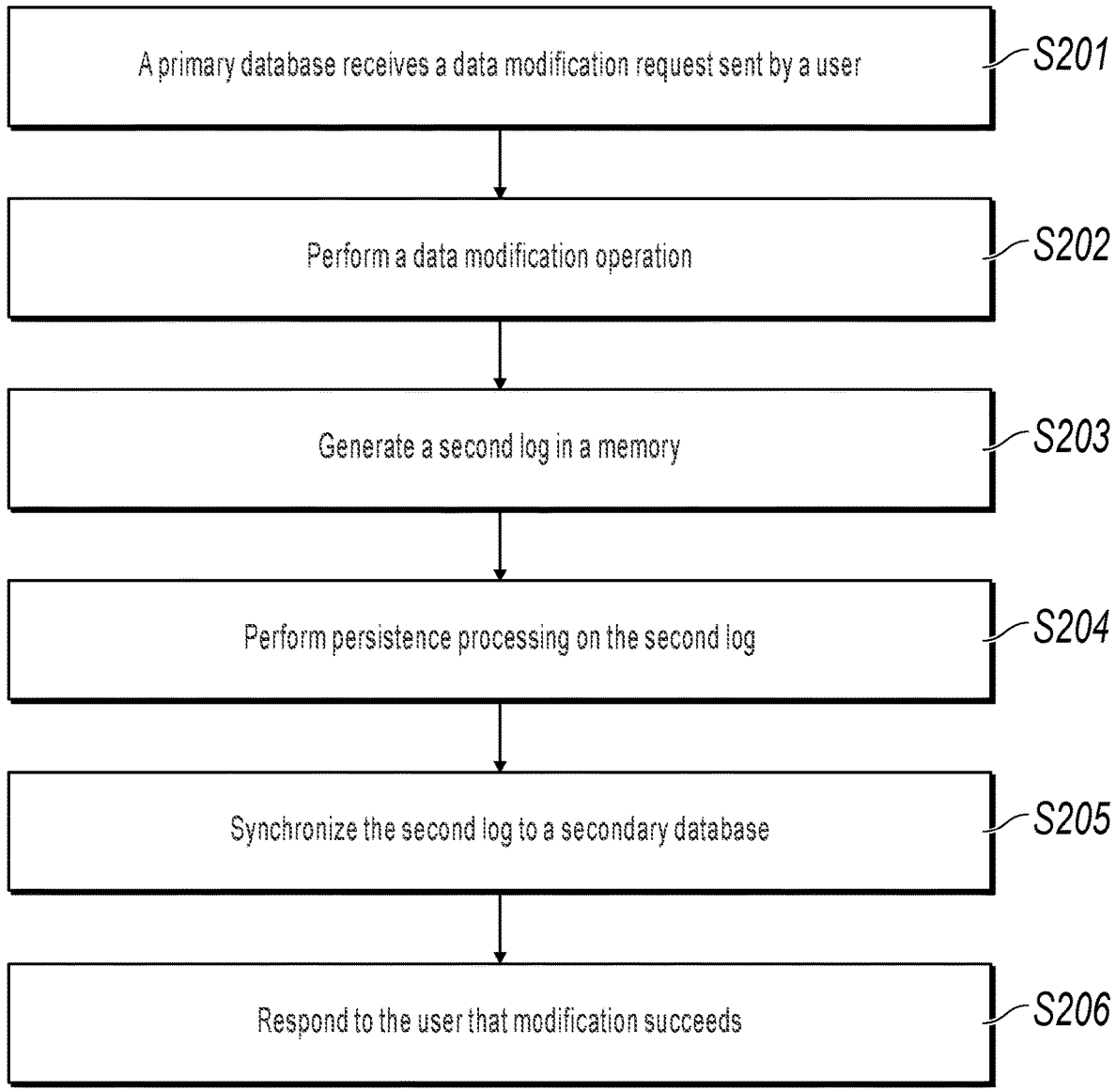
FIG. 2 is a schematic diagram illustrating a data modification request processing procedure in an actual application scenario, according to the existing technology.

FIG. 2 is a schematic diagram illustrating a data modification request processing procedure in an actual application scenario, according to the existing technology. If the procedure in FIG. 2 is performed by a primary database, the procedure can include the following steps:

S201: The primary database receives a data modification request sent by a user.

S202: The primary database performs a corresponding data modification operation based on the data modification request.

S203: The primary database generates a second log in a memory based on the data modification request or the performed data modification operation.

S204: The primary database performs persistence processing on the generated second log.

S205: The primary database synchronizes the second log that persistence processing is performed on to a secondary database.

S206: The primary database responds to the user that modification succeeds.

If an exception occurs in any one of the steps S201 to S205, step S206 may not be performed before the exception is removed.

Figure 3:
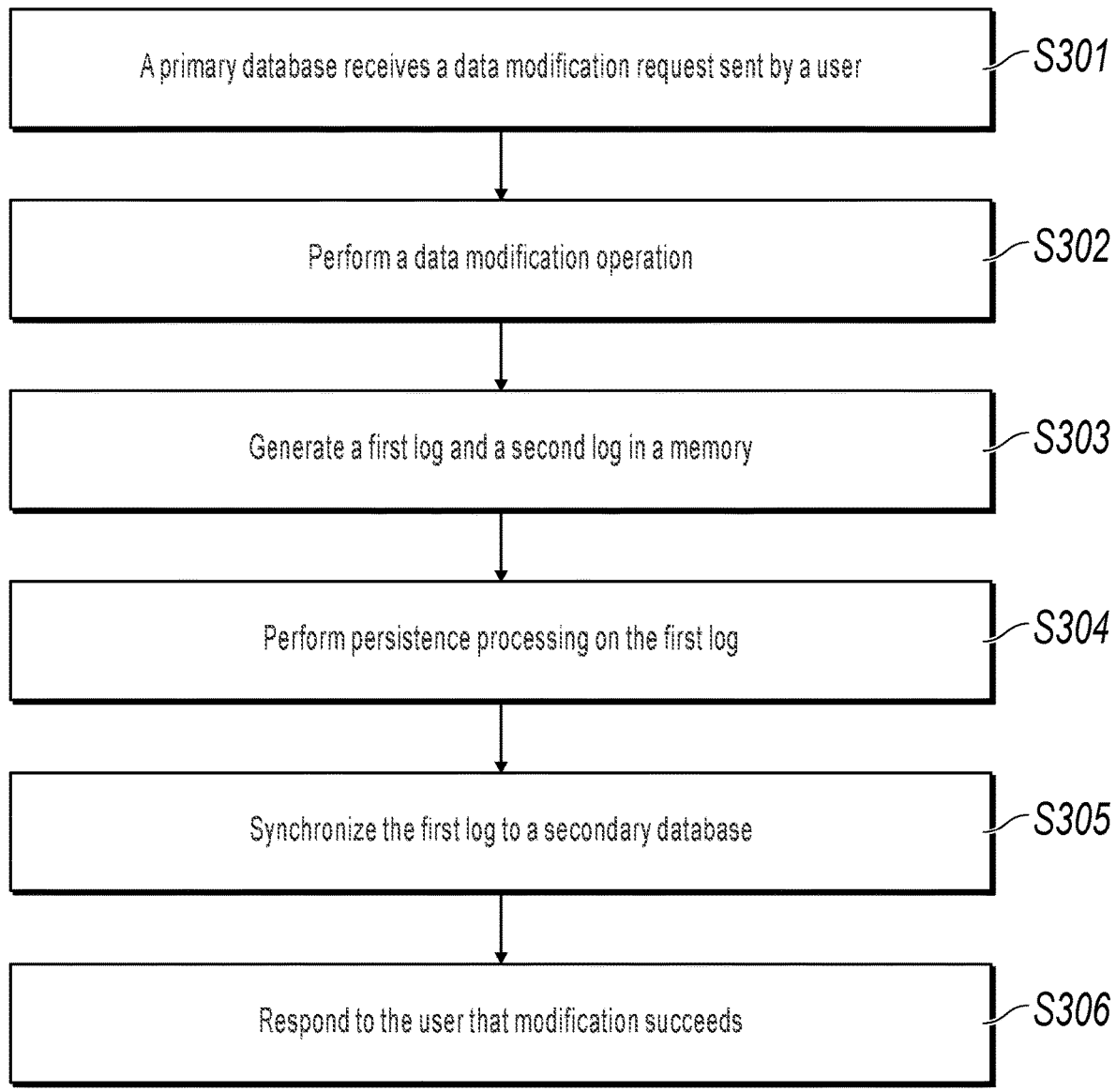
FIG. 3 is a schematic diagram illustrating a data modification request processing procedure in an actual application scenario, according to an implementation of the present application.

FIG. 3 is a schematic diagram illustrating a data modification request processing procedure in an actual application scenario, according to an implementation of the present application. If the procedure in FIG. 3 is also performed by a primary database, the procedure can include the following steps:

S301: The primary database receives a data modification request sent by a user.

S302: The primary database performs a corresponding data modification operation based on the data modification request.

S303: The primary database generates a first log and a second log in a memory based on the data modification request or the performed data modification operation.

S304: The primary database performs persistence processing on the generated first log.

S305: The primary database synchronizes the first log that persistence processing is performed on to a secondary database.

S306: The primary database responds to the user that modification succeeds.

If an exception occurs in any one of the steps S301 to S305, step S306 may not be performed before the exception is removed.

It can be seen from the comparison between the procedures in FIG. 2 and FIG. 3 that, because a data volume of the first log is less than a data volume of the second log, compared with the existing technology, a data volume of a log that persistence processing needs to be performed on, before the primary database responds to the user that modification succeeds, can be reduced in the solutions of the present application. As such, a data modification request processing time can be reduced.

In addition, the primary database synchronizes the log to the secondary database in both of the procedures in FIG. 2 and FIG. 3. The log synchronization also needs to occupy corresponding bandwidth and consume a corresponding time. Because the data volume of the first log is less than the data volume of the second log, compared with the existing technology, the bandwidth occupied by and/or the time consumed by the log synchronization can also be reduced in the solutions of the present application.

Figure 4:
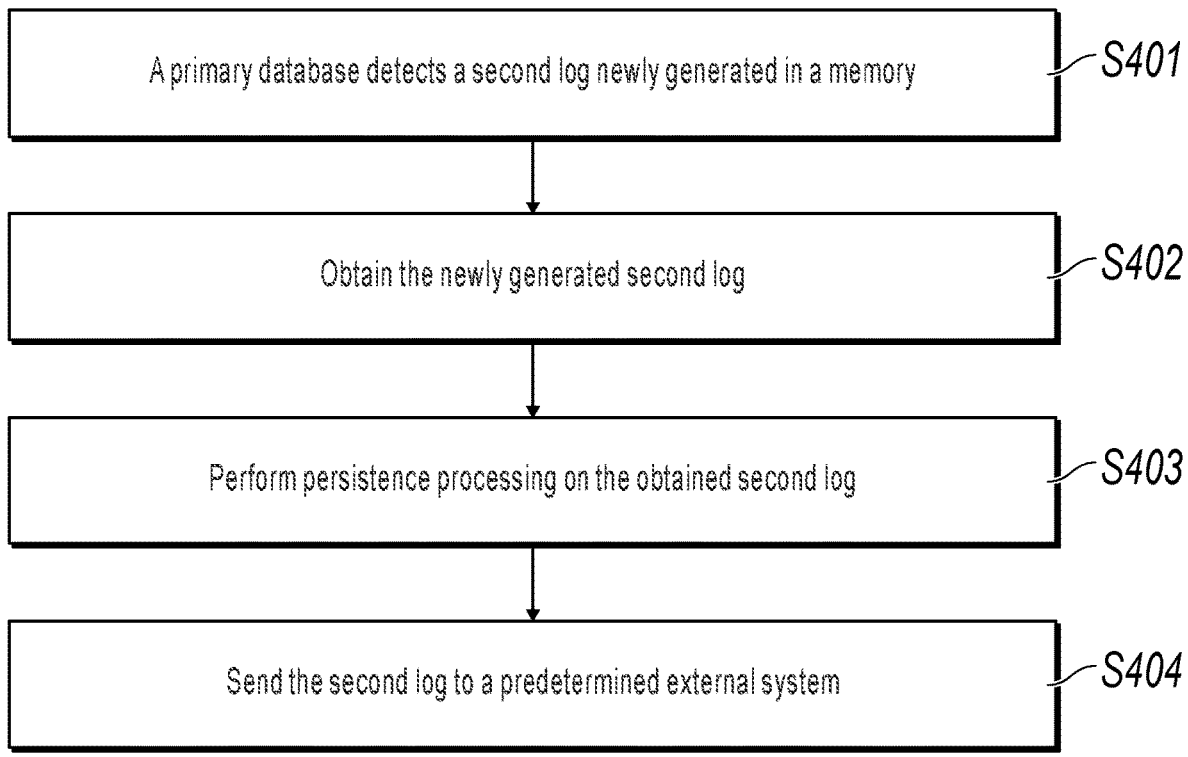
FIG. 4 is a schematic diagram illustrating a procedure for sending a log to an external system such as a data analysis system in an actual application scenario, according to an implementation of the present application.

As shown in FIG. 4, an implementation of the present application further provides a schematic diagram illustrating a procedure for sending a log to an external system such as a data analysis system in an actual application scenario. If the procedure in FIG. 4 is also performed by a primary database, the procedure can include the following steps:

S401: The primary database detects a second log newly generated in a memory.

S402: The primary database obtains the newly generated second log.

S403: The primary database performs persistence processing on the obtained second log.

S404: The primary database sends the second log to a predetermined external system.

In the present implementation of the present application, after receiving a log synchronized by the primary database, a secondary database can also perform operations such as performing persistence processing on the log and/or sending the log to the external system. However, such operation process is different from the process in the existing technology. The following describes the operations related to the secondary database.

In the existing technology, a secondary database receives a complete log (namely, the second log in the previous example), and therefore can directly perform operations such as performing persistence processing on the received log and/or sending the received log to an external system.

In the solutions of the present application, the secondary database receives a simplified log (namely, the first log in the previous example), and can only directly perform persistence processing on the received log, and it is not suitable to send the received log to the external system. In practice, the secondary database may also need to use a complete log. Therefore, the secondary database can obtain a corresponding complete log based on the simplified log, and then can perform operations such as performing persistence processing on the complete log and/or sending the complete log to the external system. As such, the consistency between logs in the primary and secondary databases can be improved. Based on such an idea, after the database synchronizes the first log to the secondary database of the database, the secondary database can perform the following step: The secondary database synchronizes the modification and generates the second log based on the first log. Further, the secondary database can perform the following steps: The secondary database performs persistence processing on the first log obtained through synchronization and/or the second log generated based on the first log; and the secondary database sends the second log to the predetermined external system.

Figure 5:
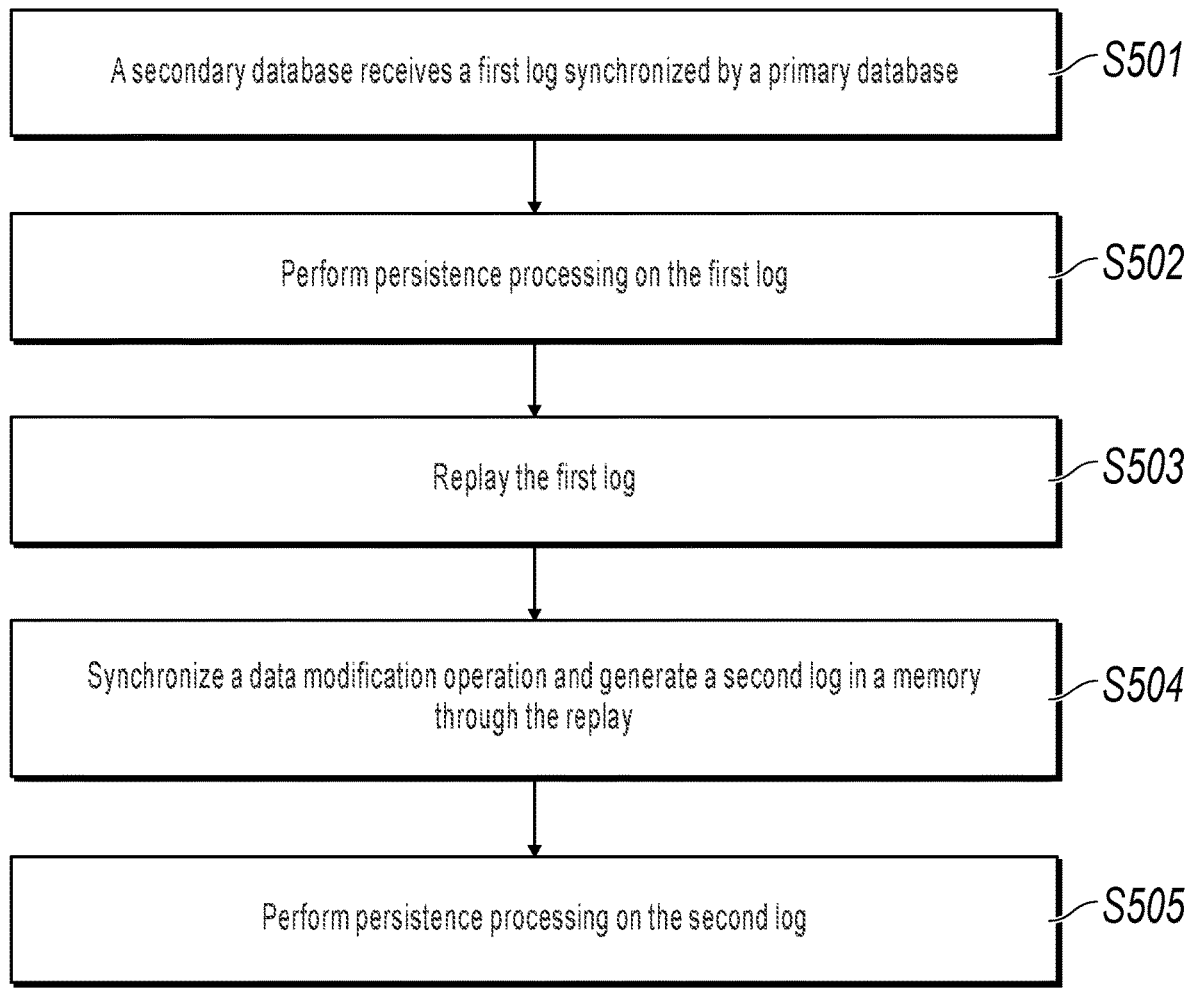
FIG. 5 is a schematic diagram illustrating a procedure that a secondary database processes a received first log synchronized by a primary database in an actual application scenario, according to an implementation of the present application.

As shown in FIG. 5, an implementation of the present application provides a schematic diagram illustrating a procedure that a secondary database processes a received first log synchronized by a primary database in an actual application scenario (by using the scenarios in FIG. 2 to FIG. 4).

If the procedure in FIG. 5 is performed by a secondary database of a primary database, the procedure can include the following steps:

S501: The secondary database receives a first log synchronized by the primary database.

S502: The secondary database performs persistence processing on the received first log.

S503: The secondary database replays the first log.

S504: The secondary database synchronizes a data modification operation and generates a second log in a memory through the replay.

S505: The secondary database performs persistence processing on the second log.

In the present implementation of the present application, as described above, the two kinds of logs: the first log and the second log, can be generated for any data modification request. To increase a subsequent speed of reading the two kinds of logs, the first log and the second log can be separately stored in different nonvolatile storage devices when performing persistence process. Therefore, the two kinds of logs can be separately read based on performance (for example, bandwidth or a reading speed) of respective storage devices, and can be read in parallel.

In the present implementation of the present application, as described above, the complete log or the second log can include other data related to modified data in addition to first data and second data. Usually, if the first data and the second data each belong to at least one database record, the "other data related to the modified data" that can be further included in the second log includes but is not limited to: data other than the first data in the database record that the first data belongs to, and/or data other than the second data in the database record that the second data belongs to.

For ease of understanding, Table 1 and Table 2 are used as an example for description.

TABLE 1

|   | column_1 | column_2 | ... | column_n |
|---|----------|----------|-----|----------|
| a | a_1      | a_2      | ... | a_n      |
| b | b_1      | b_2      | ... | b_n      |
| c | c_1      | c_2      | ... | c_n      |
| ... | ...    | ...      | ... | ...      |

Table 1 is a partial content of a data table in a database, including three database records: a, b, and c. Each record includes n key value pairs, n keys are respectively column_1 to column_n, and values that correspond to the keys in each database record are shown in Table 1. For ease of description, a key value pair and a row number of a database record that the key value pair belongs to are indicated by using <row>:<key, value>, where "key" indicates a key, "value" indicates a value, and "row" indicates the row number of the database record that the key value pair belongs to.

Assume that the database receives a data modification request sent by a user. Based on the data modification request, <a>:<column_2, a_2> is modified to <a>:<column_2, a_2'>, and <b>:<column_2, b_2> is modified to <b>:<column_2, b_2'>. The modified Table 1 is shown in the following Table 2.

TABLE 2

|   | column_1 | column_2 | ... | column_n |
|---|----------|----------|-----|----------|
| a | a_1      | a_2'     | ... | a_n      |
| b | b_1      | b_2'     | ... | b_n      |

TABLE 2-continued

|   | column_1 | column_2 | ... | column_n |
|---|----------|----------|-----|----------|
| c | c_1      | c_2      | ... | c_n      |
| ... | ...    | ...      | ... | ...      |

For the previous example, the first data is <a>:<column_2, a_2'> and <b>:<column_2, b_2'>, and the second data is <a>:<column_2, a_2> and <b>:<column_2, b_2>.

The other data related to the modified data can include other data than the modified data in record a and record b, namely, <a>:<column_1, a_1>, ..., <a>:<column_n, a_n>, and <b>:<column_1, b_1>, <b>:<column_n, b_n>.

The generated first log can include only the first data, and does not include the second data and the other data related to the modified data, as shown in the following: "<a>:<column_2, a_2'>, and <b>:<column_2, b_2'>".

The generated second log can include not only the first data but also the second data and the other data related to the modified data, as shown in the following:"<a>: second data and other data related to modified data: <column_1, a_1>, <column_2, a_2>, ..., <column_n, a_n>; first data: <column_2, a_2'>; and <b>: second data and other data related to modified data: <column_1, a_1>, <column_2, a_2>, ..., <column_n, a_n>; first data: <column_2, a_2'>".

It is worthwhile to note that a representation format of a content included in the log in the previous example is merely an example, and is not contended to limit the present application. In practice, the content can also be represented in other formats.

Figure 6:
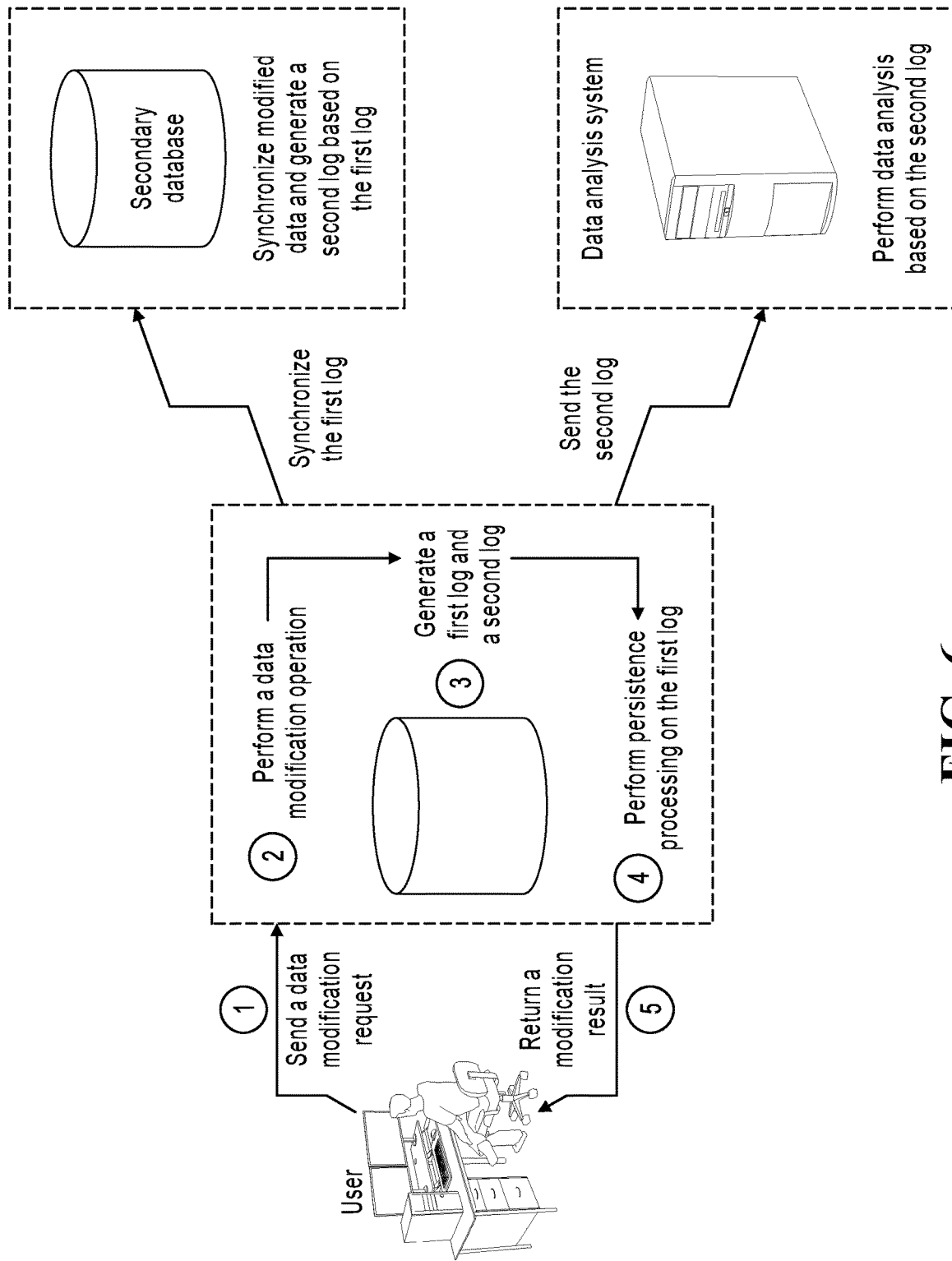
FIG. 6 is a schematic diagram illustrating interactions between terminals in the solutions of the present application in an actual application scenario (by using scenarios in FIG. 2 to FIG. 4), according to an implementation of the present application.

As shown in FIG. 6, an implementation of the present application further provides a schematic diagram illustrating interaction between terminals in the solutions of the present application in an actual application scenario (by using the scenarios in FIG. 2 to FIG. 4), to understand the solutions of the present application more intuitively.

Four terminals are mainly included in FIG. 6, and are respectively a user, a primary database, a secondary database, and a data analysis system. Steps that correspond to circled numbers "1" to "5" in FIG. 6 are main steps of a data modification request processing method provided in the present implementation of the present application, and steps without numbers are secondary steps. All the steps are separately described in detail above, and details are omitted here for simplicity.

Figure 7:
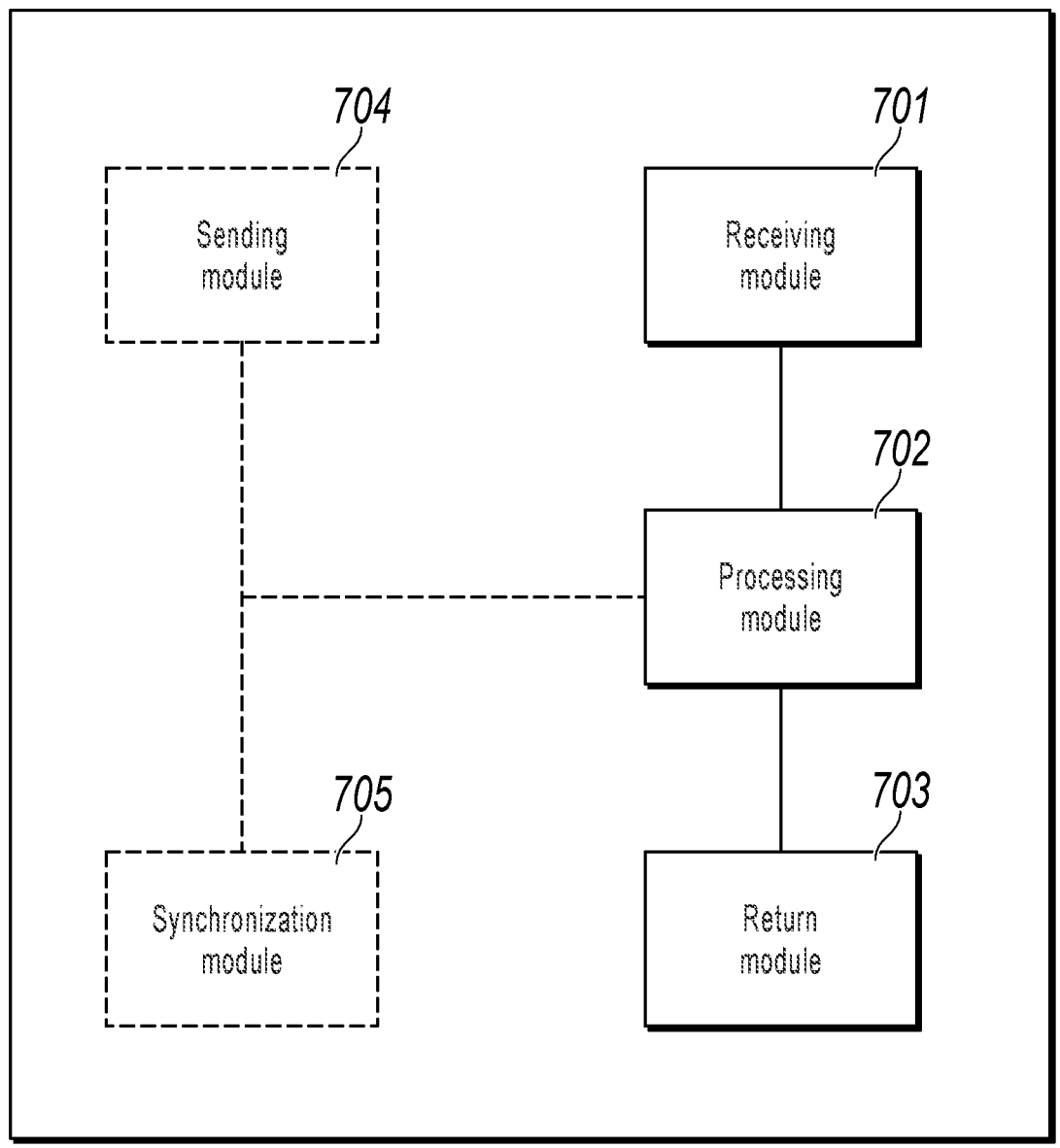
FIG. 7 is a schematic structural diagram illustrating a database data modification request processing apparatus, according to an implementation of the present application.

The above is the database data modification request processing method provided in the implementations of the present application. As shown in FIG. 7, an implementation of the present application further provides a corresponding apparatus based on the same idea.

FIG. 7 is a schematic structural diagram illustrating a database data modification request processing apparatus, according to an implementation of the present application. The apparatus includes the following: a receiving module 701, configured to receive a data modification request for a database; a processing module 702, configured to modify second data in the database to first data, and generate a first log and a second log based on the data modification request, where the first log includes the first data, and the second log includes the second data; and a return module 703, configured to return a modification result that corresponds to the data modification request after persistence processing is performed on the first log.

Optionally, the second log further includes the first data.

Optionally, the processing module 702 is configured to generate the first log and the second log in a memory.

Optionally, the processing module 702 is further configured to perform persistence processing on the second log.

Optionally, the apparatus further includes the following: a sending apparatus 704, configured to send the second log to a data analysis system, so that the data analysis system performs data analysis based on the second log.

Optionally, when the database is a primary database, the apparatus further includes the following: a synchronization module 705, configured to synchronize the first log to a secondary database of the database before the return module 703 returns the modification result that corresponds to the data modification request, so that the secondary database synchronizes the modification based on the first log.

Optionally, the first data and the second data each belong to at least one database record.

The second log further includes data other than the first data in the database record that the first data belongs to, and/or data other than the second data in the database record that the second data belongs to.

Optionally, the persistence processing includes the following: storing a log in a nonvolatile storage device.

Optionally, the persistence processing includes the following: storing a log in a nonvolatile storage device.

The first log and the second log are separately stored in different nonvolatile storage devices by using the persistence processing.

Optionally, the data modification request is a data update request, a data deletion request, or a data addition request.

Neither the first data nor the second data is null when the data modification request is a data update request; or the first data is null and the second data is not null when the data modification request is a data deletion request; or the first data is not null and the second data is null when the data modification request is a data addition request.

The apparatus in FIG. 7 can be located in the database or on a function module that does not belong to the database but can be connected to the database.

The apparatuses provided in the present application are in a one-to-one correspondence with the methods provided in the present application. Therefore, the apparatuses and the methods have the similar beneficial technical effects. The beneficial technical effects of the methods have been described above in detail, and therefore the beneficial technical effects of the apparatuses are omitted here for simplicity.

A person skilled in the art should understand that an implementation of the present invention can be provided as a method, a system, or a computer program product. Therefore, the present invention can use a form of hardware only implementations, software only implementations, or implementations with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product according to the implementations of the present invention. It should be understood that computer program instructions can be used to implement each process and/or each block in the flowcharts and/or the block diagrams and a combination of a process and/or a block in the flowcharts and/or the block diagrams. The computer program instructions can be provided for a general-purpose computer, a special-purpose computer, a built-in processor, or a processor of another programmable data processing device to generate a machine, so that the instructions executed by the computer or the processor of the other programmable data processing device generate an apparatus for implementing a specified function in one or more flows in the flowcharts and/or in one or more blocks in the block diagrams.

The computer program instructions can be stored in a computer readable memory that can instruct the computer or the other programmable data processing device to work in a specific way, so that the instructions stored in the computer readable memory generate an artifact that includes an instruction apparatus. The instruction apparatus implements a specified function in one or more flows in the flowcharts and/or in one or more blocks in the block diagrams.

The computer program instructions can be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a specified function in one or more flows in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a nonvolatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. Based on the definition in the present specification, the computer readable medium does not include transitory computer-readable media (transitory media), for example, a modulated data signal and carrier.

It is worthwhile to further note that the terms "include", "include", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, merchandise, or device that includes the element.

The previous descriptions are merely implementations of the present application, and are not intended to limit the present application. For a person skilled in the art, the present application can have various modifications and changes. Any modifications, equivalent substitutions, improvements, etc. made within the spirit and principle of the present application shall fall in the protection scope of the claims in the present application.

Figure 8:
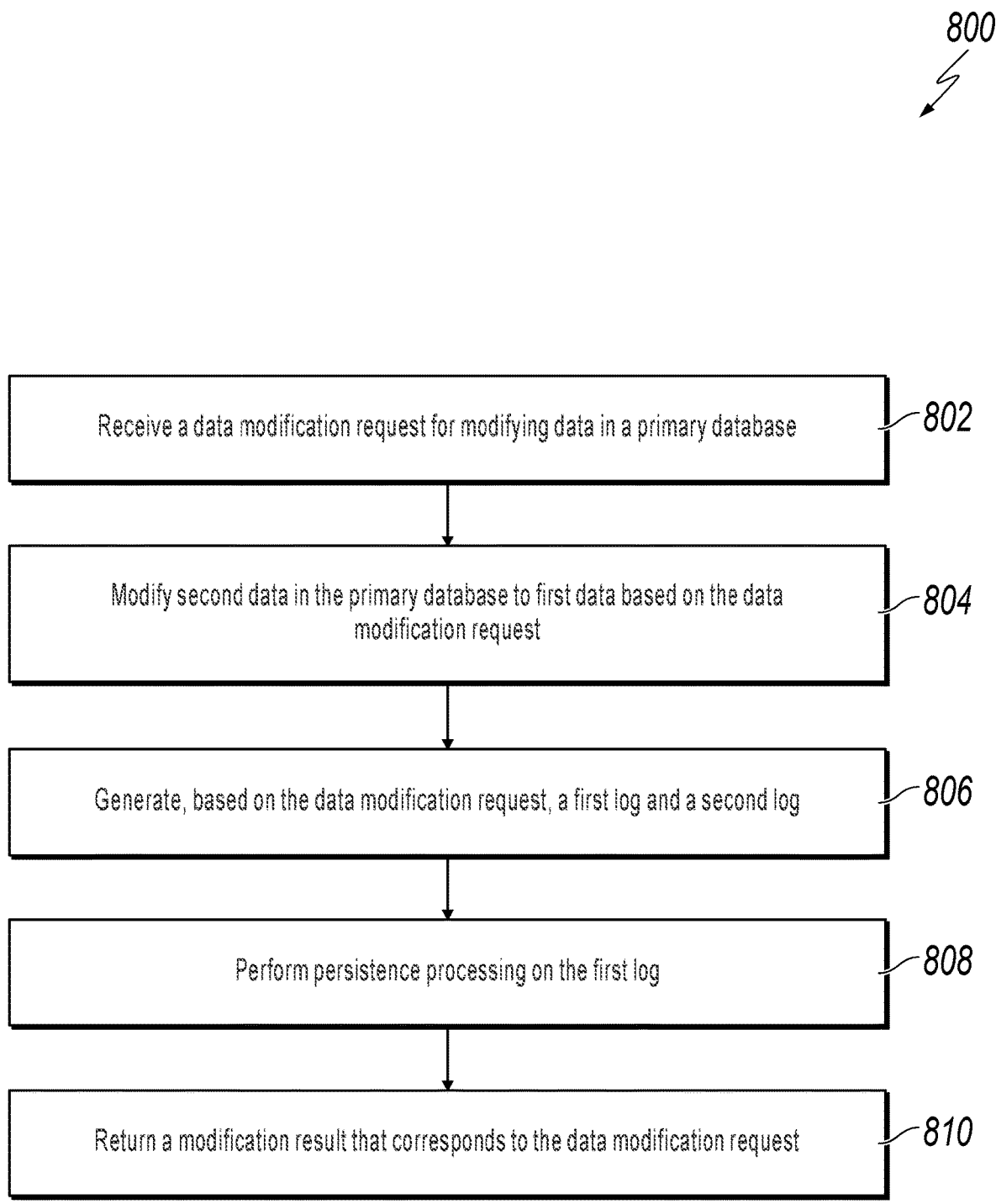
FIG. 8 is a flowchart illustrating an example of a computer-implemented method for modifying data in a database, according to an implementation of the present disclosure.

FIG. 8 is a flowchart illustrating an example of a computer-implemented method 800 for modifying data in a database, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a data modification request for modifying data in the primary database is received at a primary database. In some implementations, the data modification request includes at least one of a data update request, a data deletion request, and a data addition request. From 802, method 800 proceeds to 804.

At 804, second data in the primary database is modified to first data based on the data modification request. From 804, method 800 proceeds to 806.

At 806, a first log and a second log are generated based on the data modification request, where the first log is a simplified log including the first data, and where the second log is a complete log including the second data. In some implementations, the first log and the second log are generated in a memory, and the generated first log and the second log are in a transient and non-stable state. From 806, method 800 proceeds to 808.

At 808, persistence processing is performed on the generated first log. In some implementations, performing the persistence processing on a log includes recording the first log as a file in a certain format, and storing the file in a nonvolatile storage device. From 808, method 800 proceeds to 810.

At 810, a modification result that corresponds to the data modification request is returned. In some implementations, prior to returning the modification result, method 800 further includes temporarily withholding the modification result in response to performing the persistence processing on the first log and synchronizing the first log to a secondary database so that the secondary database synchronizes the modification based on the first log.

In some implementations, the secondary database synchronizing the modification includes: 1) receiving, at the secondary database, the first log synchronized by the primary database; 2) performing, by the secondary database, the persistence processing on the received first log; 3) performing a replay on the first log; 4) synchronizing a data modification operation and generating a second log in a memory through the replay; and 5) performing the persistence processing on the second log.

In some implementations, method 500 further includes: 1) detecting, by the primary database, a newly generated second log in a memory; 2) obtaining, the newly generated second log; 3) performing, the persistence processing on the obtained second log; and 4) sending the second log to a predetermined external system. After 810, method 800 can stop.

Implementations of the present application can solve technical problems in modifying data in a database. Traditionally, to modify data in a database, a user can send a data modification request to the database. The database then modifies data and generates a log based on the data modification request, performs persistence processing on the generated log (for example, stores the generated log on a magnetic or optical disk), and then returns to the user a modification result that corresponds to the data modification request. Further, if the database has a secondary database, the database can also first synchronize the generated log to the secondary database and then return the modification result that corresponds to the data modification request. However, performing persistence processing on the generated log or synchronizing the generated log to the secondary database typically consume a large amount of time. Consequently, in existing technology, it takes a long time for a database data modification request to be processed. What is needed is a technique to bypass these identified issues and to providing a more efficient and consistent solution for modifying data in a database.

Implementations of the present application provide methods and apparatuses for reducing time for modifying data in a database. According to these implementations, instead of generating a complete log that includes data after modification, data before modification, and other data related to modified data (such as, in conventional methods), two types of logs, namely a first log and a second log, that are not necessarily complete and whose contents are not identical, can be generated for any data modification request. In some implementations, the first log can include only the first data (that is, data after modification), not the second data (that is, data before modification), and other data related to the modification data. Because a database status can be recovered or primary/secondary synchronization can be implemented based on only the data after modification without the second data and other data related to the modified data, the modification result can be returned to the user after persistence processing is performed on the first log. This processing takes less time as a data volume of the first log is less than a data volume of a complete log. Moreover, in the described solution, the secondary database can receive a simplified log (that is, the first log) and directly perform persistence processing on the received simplified log. In this way, the secondary database can obtain a corresponding complete log based on the simplified log, and can then perform operations such as persistence processing on the complete log and/or sending the complete log to an external system. As such, consistency between logs in the primary and secondary database can be improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
 receiving, at a primary database storing a plurality of database records each having a respective value, a data modification request for modifying data in the primary database, wherein the data modification request specifies updated values of one or more of the plurality of database records;

modifying, in response to the data modification request, previous values of the one or more of the plurality of database records to have the updated values;

generating, based on the data modification request, a first log that comprises only the updated values of the one or more of the plurality of database records;

generating, based on the data modification request, a second log that comprises at least (i) the previous values of the one or more of the plurality of database records and (ii) the updated values of the one or more of the plurality of database records;

in response to receiving the data modification request, storing the updated values of the one or more of the plurality of database records in the first log and synchronizing the first log to a secondary database before returning a modification result to a user and synchronizing the previous values of the one or more of the plurality of database records in the second log to the secondary database only after returning the modification result to the user; and returning the modification result to the user that is indicative of having successfully modified the data in the primary database in response to receiving the data modification request.

2. The computer-implemented method of claim 1, wherein the data modification request comprises at least one of a data update request, a data deletion request, or a data addition request.

3. The computer-implemented method of claim 1, wherein the first log and the second log are generated in a memory, and wherein the first log and the second log are in a transient and non-stable state.

4. The computer-implemented method of claim 1, wherein generating the first log further comprises:
recording the first log as a file in a certain format, and storing the file in a nonvolatile storage device.

5. The computer-implemented method of claim 1, further comprising:
receiving, by the secondary database, the first log synchronized by the primary database;
performing, by the secondary database, persistence processing on the first log;
performing, by the secondary database, a replay on the first log;
generating, by the secondary database, the second log in a memory through the replay; and
performing, by the secondary database, persistence processing on the second log.

6. The computer-implemented method of claim 1, further comprising:
detecting, by the primary database, a newly generated second log in a memory;
obtaining the newly generated second log;
performing persistence processing on the newly generated second log; and
sending the newly generated second log to an external data analysis system that is configured to perform real-time or non-real-time analysis of primary database based on the newly generated second log.

7. A non-transitory, computer-readable medium storing one or more instructions executable by a computer system to perform operations comprising:

receiving, at a primary database storing a plurality of database records each having a respective value, a data modification request for modifying data in the primary database, wherein the data modification request specifies updated values of one or more of the plurality of database records;

modifying, in response to the data modification request, previous values of the one or more of the plurality of database records to have the updated values;

generating, based on the data modification request, a first log that comprises only the updated values of the one or more of the plurality of database records;

generating, based on the data modification request, a second log that comprises at least (i) the previous values of the one or more of the plurality of database records and (ii) the updated values of the one or more of the plurality of database records;

in response to receiving the data modification request, storing the updated values of the one or more of the plurality of database records in the first log and synchronizing the first log to a secondary database before returning a modification result to a user and synchronizing the previous values of the one or more of the plurality of database records in the second log to the secondary database only after returning the modification result to the user; and returning the modification result to the user that is indicative of having successfully modified the data in the primary database in response to receiving the data modification request.

8. The non-transitory, computer-readable medium of claim 7, wherein the data modification request comprises at least one of a data update request, a data deletion request, or a data addition request.

9. The non-transitory, computer-readable medium of claim 7, wherein the first log and the second log are generated in a memory, and wherein the first log and the second log are in a transient and non-stable state.

10. The non-transitory, computer-readable medium of claim 7, wherein generating the first log further comprises:
recording the first log as a file in a certain format, and storing the file in a nonvolatile storage device.

11. The non-transitory, computer-readable medium of claim 7, wherein the operations further comprise:
receiving, by the secondary database, the first log synchronized by the primary database;
performing, by the secondary database, persistence processing on the first log;
performing, by the secondary database, a replay on the first log;
generating, by the secondary database, the second log in a memory through the replay; and
performing, by the secondary database, persistence processing on the second log.

12. The non-transitory, computer-readable medium of claim 7, wherein the operations further comprise:
detecting, by the primary database, a newly generated second log in a memory;
obtaining the newly generated second log;
performing persistence processing on the newly generated second log; and
sending the second log to an external data analysis system that is configured to perform real-time or non-real-time analysis of primary database based on the newly generated second log.

13. A computer-implemented system, comprising:
one or more computers; and one or more computer memory devices interoperably coupled with the one or more computers and having tangible, non-transitory, machine-readable media storing one or more instructions that, when executed by the one or more computers, perform one or more operations comprising:

receiving, at a primary database storing a plurality of database records each having a respective value, a data modification request for modifying data in the primary database, wherein the data modification request specifies updated values of one or more of the plurality of database records;

modifying, in response to the data modification request, previous values of the one or more of the plurality of database records to have the updated values;

generating, based on the data modification request, a first log that comprises only the updated values of the one or more of the plurality of database records;

generating, based on the data modification request, a second log that comprises at least (i) the previous values of the one or more of the plurality of database records and (ii) the updated values of the one or more of the plurality of database records;

in response to receiving the data modification request, storing the updated values of the one or more of the plurality of database records in the first log and synchronizing the first log to a secondary database before returning a modification result to a user and synchronizing the previous values of the one or more of the plurality of database records in the second log to the secondary database only after returning the modification result to the user; and returning the modification result to the user that is indicative of having successfully modified the data in the primary database in response to receiving the data modification request.

14. The computer-implemented system of claim 13, wherein the data modification request comprises at least one of a data update request, a data deletion request, or a data addition request.

15. The computer-implemented system of claim 13, wherein the first log and the second log are generated in a memory, and wherein the first log and the second log are in a transient and non-stable state.

16. The computer-implemented system of claim 13, wherein generating the first log further comprises:
recording the first log as a file in a certain format, and storing the file in a nonvolatile storage device.

17. The computer-implemented system of claim 13, wherein the operations further comprise:
receiving, by the secondary database, the first log synchronized by the primary database;
performing, by the secondary database, persistence processing on the first log;
performing, by the secondary database, a replay on the first log;
generating, by the secondary database, the second log in a memory through the replay; and
performing, by the secondary database, persistence processing on the second log.

18. The computer-implemented system of claim 13, wherein the operations further comprise:
detecting, by the primary database, a newly generated second log in a memory;
obtaining the newly generated second log;
performing persistence processing on the newly generated second log; and
sending the newly generated second log to an external data analysis system that is configured to perform real-time or non-real-time analysis of primary database based on the newly generated second log.

19. The method of claim 1, wherein storing the updated values of the one or more of the plurality of database records in the first log comprises:
performing persistence processing to store the first log in persistent storage.

20. The non-transitory, computer-readable medium of claim 7, wherein storing the updated values of the one or more of the plurality of database records in the first log comprises:
performing persistence processing to store the first log in persistent storage.

21. The computer-implemented system of claim 13, wherein storing the updated values of the one or more of the plurality of database records in the first log comprises:
performing persistence processing to store the first log in persistent storage.

22. The method of claim 1, wherein synchronizing the first log to the secondary database comprises allowing for the secondary database to modify data locally maintained at the secondary database in response to the data modification request received at the primary database.

23. The non-transitory, computer-readable medium of claim 7, wherein synchronizing the first log to the secondary database comprises allowing for the secondary database to modify data locally maintained at the secondary database in response to the data modification request received at the primary database.

24. The computer-implemented system of claim 13, wherein synchronizing the first log to the secondary database comprises allowing for the secondary database to modify data locally maintained at the secondary database in response to the data modification request received at the primary database.

* * * * *